United States Patent
Sato

(10) Patent No.: US 12,061,826 B2
(45) Date of Patent: Aug. 13, 2024

(54) INKJET PRINTER FOR DISPLAYING ON DISPLAY UNIT PROMOTION MESSAGE, NON-TRANSITORY COMPUTER-READABLE RECORDING MEDIUM STORING COMPUTER-READABLE INSTRUCTIONS FOR INKJET PRINTER FOR DISPLAYING ON DISPLAY UNIT PROMOTION MESSAGE, PRINTER FOR DISPLAYING ON DISPLAY UNIT PROMOTION MESSAGE AND NON-TRANSITORY COMPUTER-READABLE RECORDING MEDIUM STORING COMPUTER-READABLE INSTRUCTIONS FOR PRINTER FOR DISPLAYING ON DISPLAY UNIT PROMOTION MESSAGE

(71) Applicant: BROTHER KOGYO KABUSHIKI KAISHA, Nagoya (JP)

(72) Inventor: Hirokazu Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/348,472

(22) Filed: Jul. 7, 2023

(65) Prior Publication Data

US 2024/0012588 A1 Jan. 11, 2024

(30) Foreign Application Priority Data

Jul. 7, 2022 (JP) .................. 2022-109627
Apr. 19, 2023 (JP) .................. 2023-068626

(51) Int. Cl.
*G06F 3/12* (2006.01)

(52) U.S. Cl.
CPC ............ *G06F 3/121* (2013.01); *G06F 3/1229* (2013.01); *G06F 3/1256* (2013.01)

(58) Field of Classification Search
None
See application file for complete search history.

(56) References Cited

U.S. PATENT DOCUMENTS

| | | | |
|---|---|---|---|
| 2015/0348499 A1* | 12/2015 | Kasamatsu | G09G 5/00 345/212 |
| 2018/0165751 A1* | 6/2018 | Chiyo | G06Q 10/0833 |
| 2020/0096900 A1* | 3/2020 | Moriya | G03G 15/0863 |
| 2020/0096928 A1* | 3/2020 | Moriya | G03G 15/5079 |
| 2020/0225885 A1* | 7/2020 | Akimoto | G06Q 30/06 |
| 2020/0333721 A1* | 10/2020 | Taniguchi | G03G 15/5058 |
| 2021/0241057 A1* | 8/2021 | Arazaki | G06K 15/1886 |
| 2024/0040053 A1* | 2/2024 | Sato | H04N 1/00315 |

FOREIGN PATENT DOCUMENTS

| | | |
|---|---|---|
| JP | 2000-236458 A | 8/2000 |
| JP | 2020-111023 A | 7/2020 |
| WO | 02/27572 A1 | 4/2002 |

* cited by examiner

*Primary Examiner* — Henok Shiferaw
(74) *Attorney, Agent, or Firm* — Merchant & Gould P.C.

(57) ABSTRACT

A printer may include a print executing unit. The printer may, in a case where a predetermined operation is accepted from a user of the printer, cause the print executing unit to execute a print preparation action; and in a case where the print preparation action is executed by the print executing unit, display on a display unit a promotion message for prompting subscription to a service related to the printer.

15 Claims, 8 Drawing Sheets

FIG. 1

Communication System 2

Figure 2:
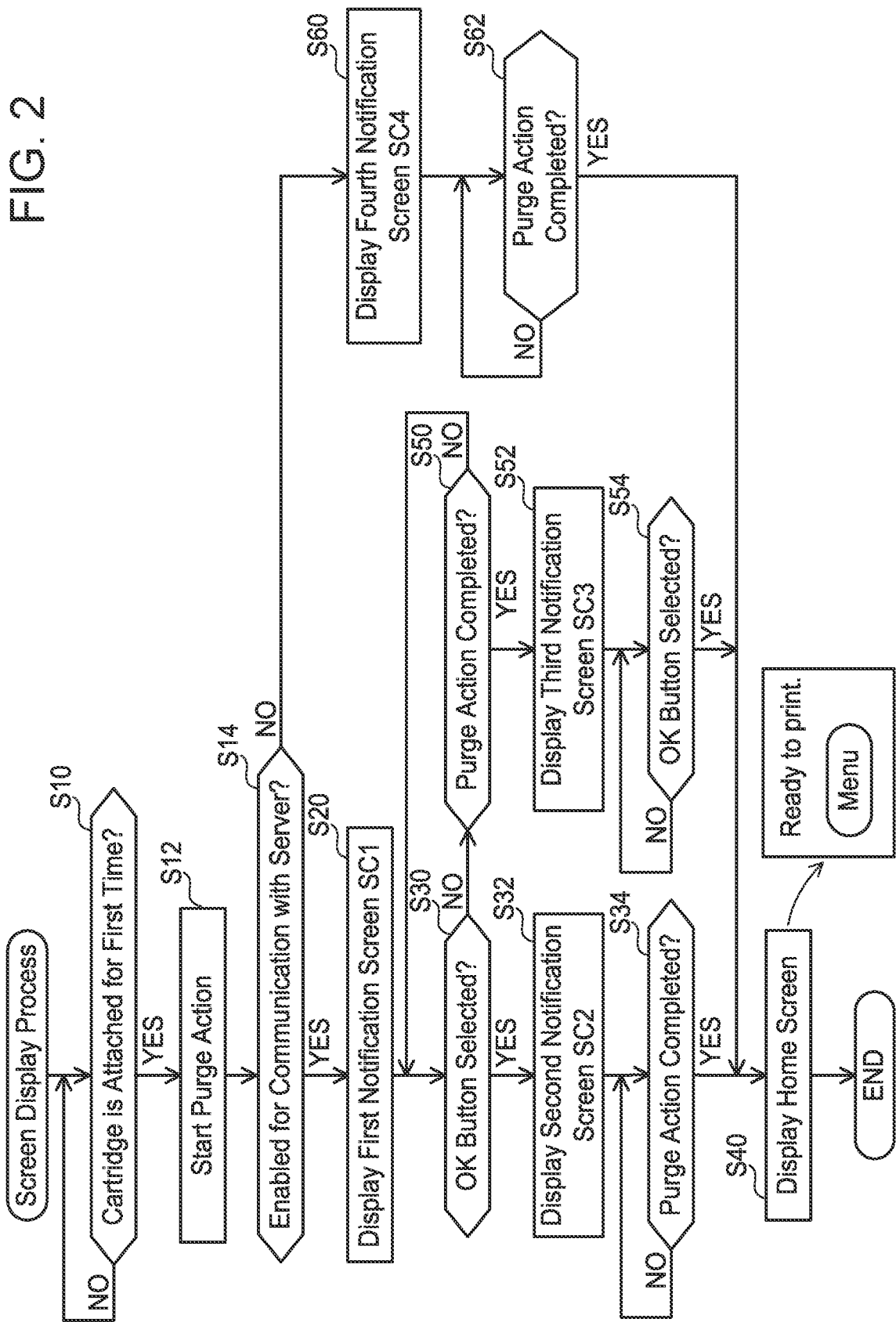

(Second Embodiment)
Communication System 402

INKJET PRINTER FOR DISPLAYING ON DISPLAY UNIT PROMOTION MESSAGE, NON-TRANSITORY COMPUTER-READABLE RECORDING MEDIUM STORING COMPUTER-READABLE INSTRUCTIONS FOR INKJET PRINTER FOR DISPLAYING ON DISPLAY UNIT PROMOTION MESSAGE, PRINTER FOR DISPLAYING ON DISPLAY UNIT PROMOTION MESSAGE AND NON-TRANSITORY COMPUTER-READABLE RECORDING MEDIUM STORING COMPUTER-READABLE INSTRUCTIONS FOR PRINTER FOR DISPLAYING ON DISPLAY UNIT PROMOTION MESSAGE

REFERENCE TO RELATED APPLICATIONS

This application claims priority from Japanese Patent Application No. 2022-109627 filed on Jul. 7, 2022, and Japanese Patent Application No. 2023-068626 filed on Apr. 19, 2023. The entire contents of the priority applications are incorporated herein by reference.

BACKGROUND ART

An automatic toner order system including an MFP, an information management server and a delivery management server is known. When a toner low occurs, the MFP displays information indicating that the toner low has occurred. Then, when a toner delivery contract is not made, the MFP displays a screen for promoting the toner delivery contract.

DESCRIPTION

The present disclosure aims at improving user convenience in a technology that prompts a user to subscribe to a service related to a printer.

An inkjet printer disclosed in the disclosure may comprise: a print executing unit comprising a print head configured to eject ink, wherein before an ink cartridge is attached to the print executing unit for a first time, moisturizing liquid is filled within the print head; and a controller configured to: in a case where the ink cartridge is attached to the print executing unit for a first time, cause the print head to execute a purge action for discharging the moisturizing liquid; and while the purge action is being executed by the print head, display on a display unit a promotion message for prompting subscription to a service related to the inkjet printer.

According to the above configuration, the inkjet printer displays the promotion message while the purge action is being executed by the print head. Therefore, the user can check the promotion message while the purge action is being executed. Thus, user convenience can be improved.

Further, a printer disclosed in the disclosure may comprise: a print executing unit; and a controller configured to: in a case where a predetermined operation is accepted from a user of the printer, cause the print executing unit to execute a print preparation action; and in a case where the print preparation action is executed by the print executing unit, display on a display unit a promotion message for prompting subscription to a service related to the printer.

According to the above configuration, the printer displays the promotion message when the print preparation action is executed by the print executing unit. Therefore, the user can check the promotion message. Thus, user convenience can be improved.

A computer program for realizing the above inkjet printer and a computer-readable recording medium storing the computer program are also novel and useful. Further, a method executed by the above inkjet printer is also novel and useful. Further, a computer program for realizing the above printer and a computer-readable recording medium storing the above computer program is also novel and useful. Further, a method executed by the above printer is also novel and useful.

Figure 3:
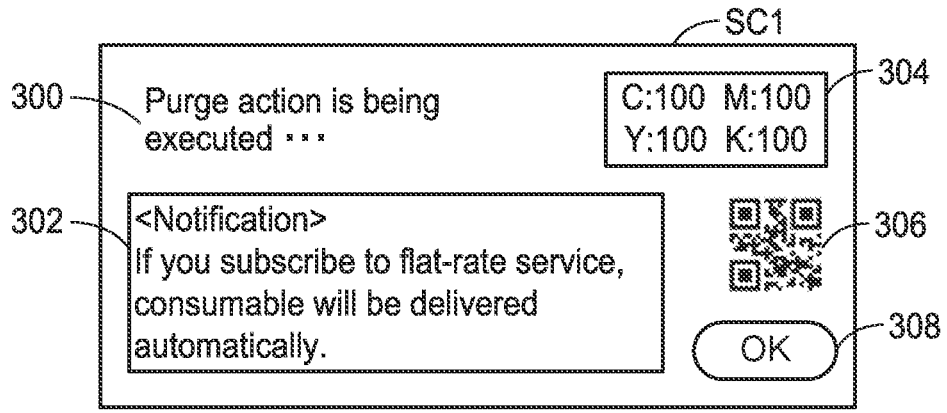
Figure 4:
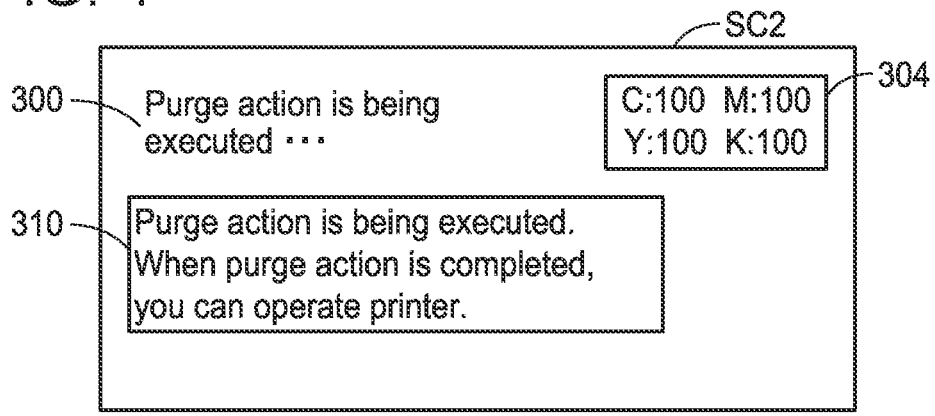
Figure 5:
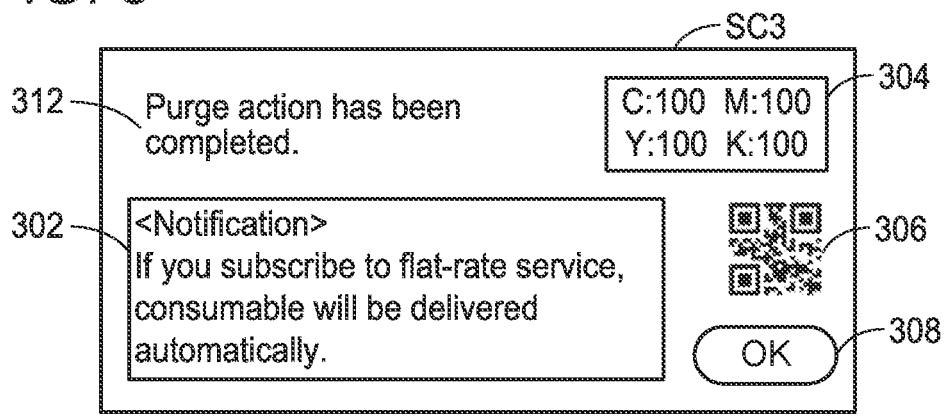
Figure 6:
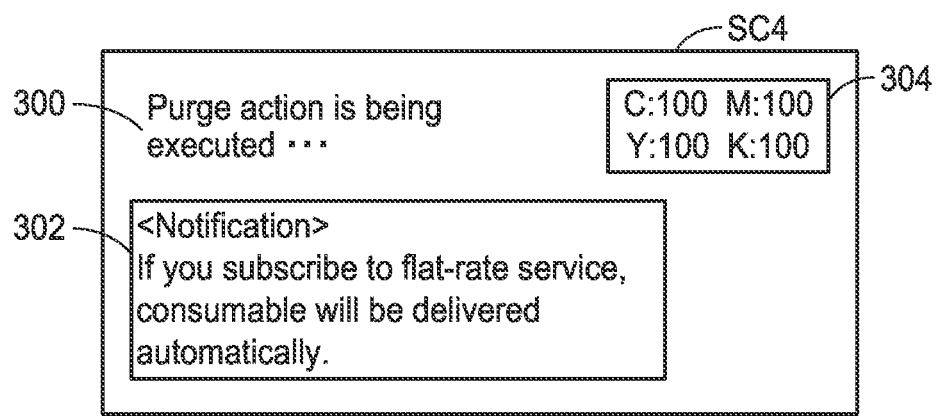
Figure 7:
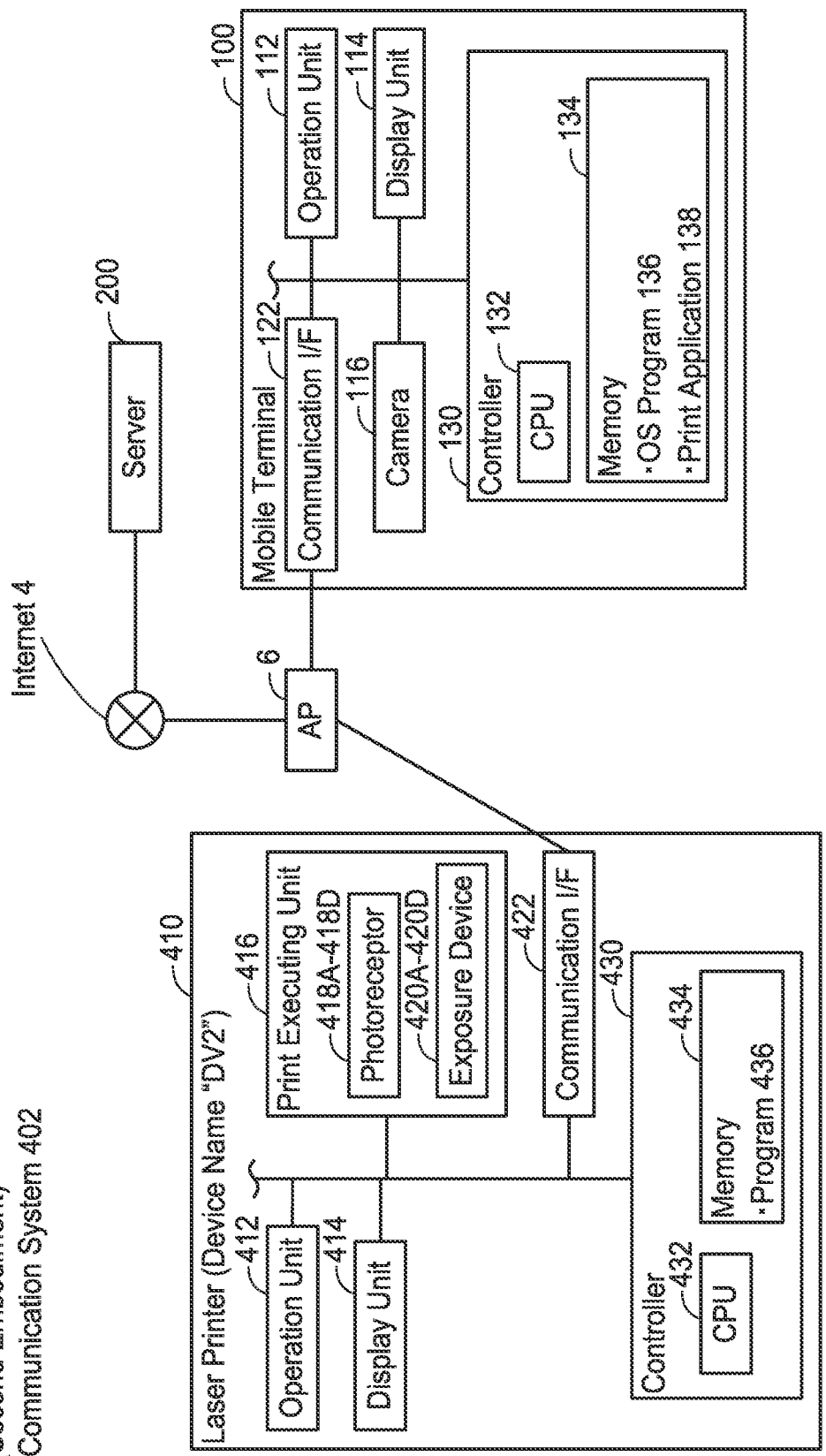
Figure 8:
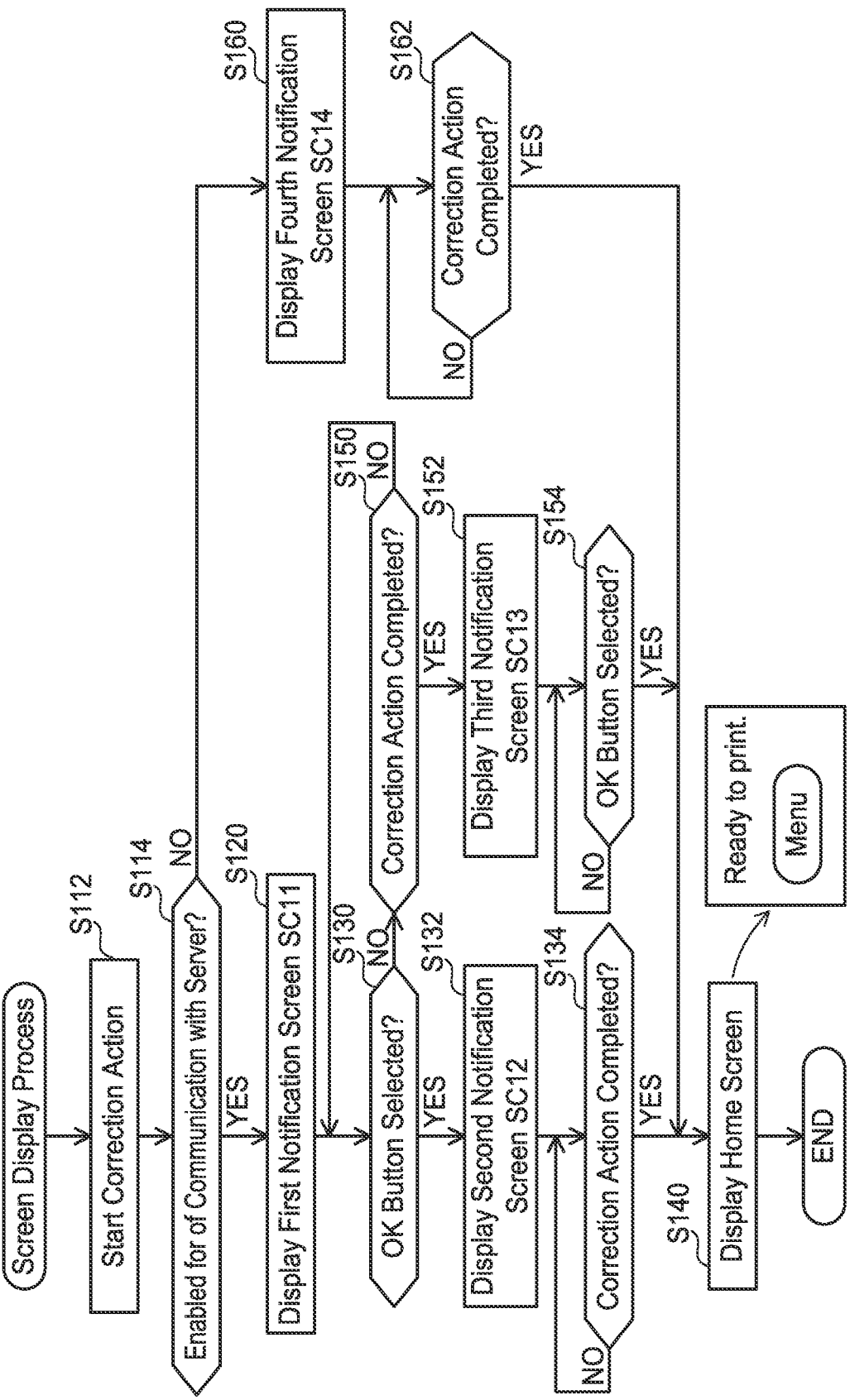
Figure 9:
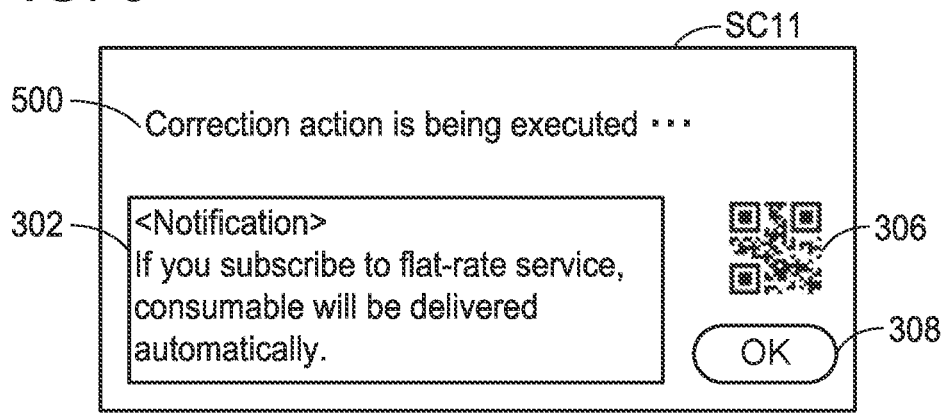
Figure 10:
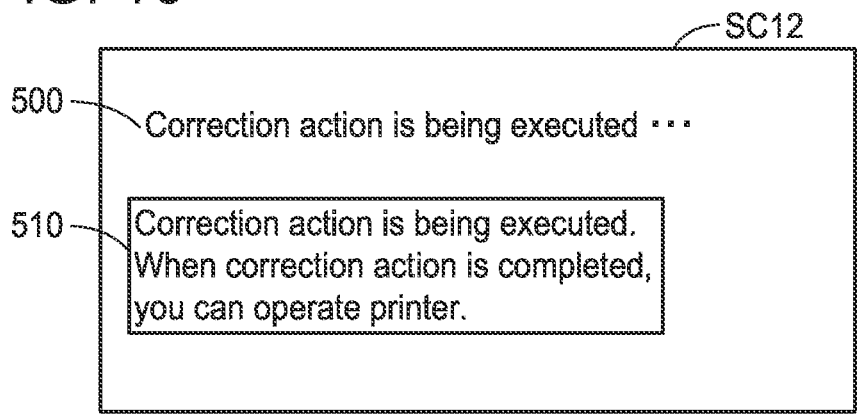
Figure 11:
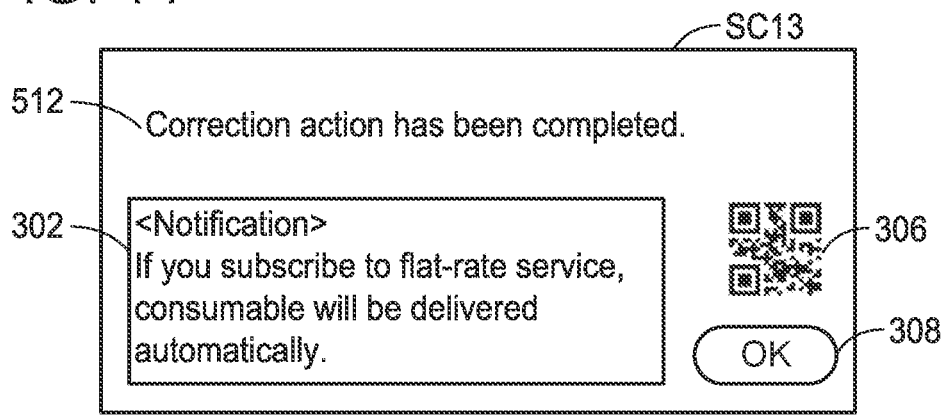
Figure 12:
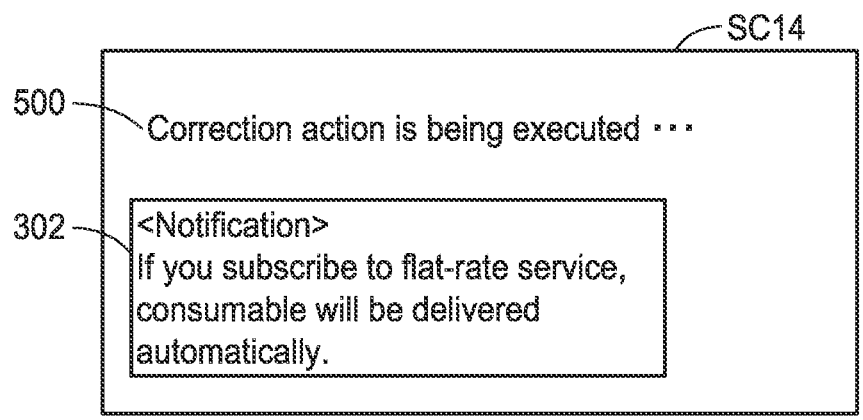

FIG. 1 illustrates a structure of a communication system.
FIG. 2 illustrates a flowchart of a screen display process.
FIG. 3 illustrates an example of a notification screen.
FIG. 4 illustrates an example of the notification screen.
FIG. 5 illustrates an example of the notification screen.
FIG. 6 illustrates an example of the notification screen.
FIG. 7 illustrates a configuration of a communication system of a second embodiment.
FIG. 8 illustrates a flowchart of a screen display process of the second embodiment.
FIG. 9 illustrates an example of a notification screen of the second embodiment.
FIG. 10 illustrates an example of the notification screen of the second embodiment.
FIG. 11 illustrates an example of the notification screen of the second embodiment.
FIG. 12 illustrates an example of the notification screen of the second embodiment.

EMBODIMENTS (Configuration of Communication System 2; FIG. 1)

As illustrated in FIG. 1, a communication system 2 includes an inkjet printer 10, a mobile terminal 100, a server 200, and an access point 6. Hereafter, the inkjet printer 10 may be described simply as "printer 10". The access point 6 is also described as "AP 6". The printer 10 and the mobile terminal 100 are connected to the AP 6. The printer 10 and the mobile terminal 100 are configured to communicate with each other via the AP 6. The server 200 is connected to the Internet 4. The printer 10, the mobile terminal 100, and the server 200 are configured to communicate via the Internet 4. The server 200 provides a service related to the printer 10. In the present embodiment, this service is a flat-rate printing service (hereinafter described as "flat-rate service").

(Configuration of Printer 10)

The printer 10 is a peripheral device configured to execute a printing function (e.g., a peripheral device of the mobile terminal 100). In a modification, the printer 10 may be a multifunctional device configured to execute a scanning function, a facsimile function, and the like, in addition to the printing function. The printer 10 has a device name "DV1". The printer 10 includes an operation unit 12, a display unit 14, a print executing unit 16, a communication interface 22, and a controller 30.

The operation unit 12 includes a plurality of keys. The user can input various instructions to the printer 10 by operating the operation unit 12. The display unit 14 is a display that displays various information. The display unit 14 also functions as a so-called touch screen (i.e., an operation unit that accepts an operation from a user).

The print executing unit 16 includes a printing mechanism of an inkjet scheme. The print executing unit 16 includes a print head 18. The print head 18 is a head for printing characters, images, and the like, on print sheet. An ink cartridge 20 that contains ink is detachably attached to the print executing unit 16. The print executing unit 16 executes printing by using ink in the ink cartridge 20. The ink cartridge includes a dedicated cartridge that can be used only when the user receives the provision of the flat-rate service, and a general-purpose cartridge that can be used when the user does not receive the provision of the flat-rate service. When the printer 10 is shipped and on sale, the ink cartridge 20 is not attached to the print executing unit 16. When the printer 10 is shipped and on sale, the print head 18 is filled with a moisturizing liquid that has a higher viscosity than the ink in the ink cartridge 20 in order to prevent the print head 18 from getting dried.

The communication I/F 22 is connected to the AP 6. The communication I/F 22 is a wireless I/F.

The controller 30 includes a CPU 32 and a memory 34. The CPU 32 executes various processes according to a program 36 stored in the memory 34. The memory 34 is configured of a volatile memory, a non-volatile memory, and the like.

(Configuration of Mobile Terminal 100)

The mobile terminal 100 is a portable terminal such as a cell phone (e.g., smartphone), a PDA, a tablet PC, or the like. The mobile terminal 100 includes an operation unit 112, a display unit 114, a camera 116, a communication I/F 122, and a controller 130.

The operation unit 112 includes a plurality of keys. The user can input various instructions to the mobile terminal 100 by operating the operation unit 112. The display unit 114 is a display for displaying various kinds of information. The display unit 114 also functions as a touch screen (i.e., an operation unit) for accepting instructions from the user. The camera 116 is a device for capturing (photographing) an object, and in the present embodiment, it is used to capture a QR Code (registered trademark). The communication I/F 122 is connected to the AP 6. The communication I/F 122 is a wireless I/F.

The controller 130 includes a CPU 132 and a memory 134. The CPU 132 executes various processes according to programs 136 and 138 stored in the memory 134. The memory 134 is configured of a volatile memory, a nonvolatile memory, and the like. The memory 134 stores an Operating System (OS) program 136 and a print application 138. The OS program 136 is a program for controlling the basic operation of the mobile terminal 100. The print application 138 is an application for causing the printer 10 to execute printing by using the mobile terminal 100.

(Configuration of Server 200)

The server 200 is installed on the Internet 4 by the vendor of the printer 10. In a modification, the server 200 may be installed on the Internet 4 by a provider different from this vendor. In another modification, the vendor of the printer 10 may not prepare its own hardware of the server 200, but may use an environment provided by an external cloud computing service. In this case, the vendor of the printer 10 may prepare a program (i.e., software) for the server 200 and implement the server 200 by introducing it into the environment described above. The server 200 provides a service (i.e., flat-rate service) related to the printer 10. The flat-rate service is a service in which the user is charged with predetermined fees when the number of printed sheets printed in a predetermined period (e.g., one month) is equal to or less than the contractual number of printed sheets (e.g., 1,000 sheets). The flat-rate service includes a service automatically shipping a new dedicated cartridge when a remaining amount of ink in the dedicated cartridge attached to the print executing unit 16 of the printer 10 becomes equal to or less than a predetermined remaining amount. The server 200 also ships the dedicated cartridge to the user when the user subscribes to the flat-rate service. In a modification, the server 200 may provide a pay-per-use print service, which is a service in which the user is charged with fees based on the number of sheets printed in a predetermined period (e.g., one month), instead of the flat-rate service.

(Screen Display Process: FIG. 2)

With reference to FIG. 2, a screen display process executed by the CPU 32 of the printer 10 will be described. The CPU 32 executes the process of FIG. 2 when the printer 10 is turned on.

In S10, the CPU 32 monitors a cartridge being attached to the print executing unit 16 for the first time. When the cartridge is attached to the print executing unit 16 for the first time, the CPU 32 determines YES in S10, and proceeds to S12. Generally, the cartridge attached to the print executing unit 16 for the first time is a general-purpose cartridge.

In S12, the CPU 32 starts a purge action using the print head 18. As described above, the print head 18 is filled with the moisturizing liquid when the printer 10 is shipped or on sale. Therefore, when the user purchases the printer 10 as well, the print head 18 is filled with the moisturizing liquid. In order to execute printing using the print executing unit 16, it is necessary to replace the moisturizing liquid filled in print head 18 with ink. Thus, the CPU 32 causes the print head 18 to execute the purge action to discharge the moisturizing liquid in the print head 18 and introduce the ink from the attached ink cartridge into the print head 18.

In S14, the CPU 32 determines whether the printer 10 is enabled for communication with the server 200. Specifically, the CPU 32 sends a keepalive signal to the server 200 and determines whether a response signal to the keepalive signal is received from the server 200. When the CPU 32 receives the response signal from the server 200 (YES in S14), the CPU 32 proceeds to S20, while when the CPU 32 does not receive the response signal from the server 200 (NO in S14), the CPU 32 proceeds to S60. The CPU 32 may determine whether the printer 10 is enabled for communication with the server 200 by determining whether the printer 10 is connected to the AP 6. The CPU 32 may also determine whether the printer 10 is enabled for communication with the server 200 by determining whether an operation to connect the printer 10 to a network has been performed by the user.

In S20, the CPU 32 displays a first notification screen SC1 on the display unit 14. As illustrated in FIG. 3, the first notification screen SC1 includes a first execution message 300 indicating that the purge action is being executed, a promotion message 302 to prompt the user to subscribe to the flat-rate service, remaining amount information 304 indicating the remaining amount of ink in the ink cartridge, a QR Code 306 obtained by encoding a URL for subscribing to the flat-rate service (specifically, a URL for accessing the server 200), and an OK button 308. The remaining amount information 304 is also information that indicates that the ink cartridge is correctly attached to the print executing unit 16. The user can access the server 200 and subscribe to the flat-rate service by capturing the QR Code 306 on the first notification screen SC1 using the camera 116 of the mobile terminal 100. Once the user subscribes to the flat-rate service, a dedicated cartridge is shipped to the user. When the user attaches the dedicated cartridge to the print executing unit 16, the printer 10 sends, to the server 200, a start request requesting the start of the flat-rate service. When the server 200 receives the start request from the printer 10, the server 200 starts the provision of the flat-rate service. In this way, the user can subscribe to the flat-rate service by using the QR Code 306 displayed on the first notification screen SC1. In a modification, instead of the QR Code 306, the CPU 32 may display, on the first notification screen SC1, the URL of the server 200, link information for accessing the server 200, and/or the like. In another modification, instead of the remaining amount information 304, the CPU 32 may display, on the first notification screen SC1, an image and/or the like indicating that the ink cartridge is correctly attached.

As described above, the first notification screen SC1 includes the remaining amount information 304. Thus, by checking the remaining amount information 304, the user can know that the ink cartridge is correctly attached to the print executing unit 16.

In S30 of FIG. 2, the CPU 32 monitors that the OK button 308 on the first notification screen SC1 being selected. When the OK button 308 is selected, the CPU 32 determines that a display termination instruction, which is an instruction to terminate displaying the first notification screen SC1, is accepted from the user. In this case, the CPU 32 determines YES in S30 and proceeds to S32.

In S32, the CPU 32 displays a second notification screen SC2 on the display unit 14. As illustrated in FIG. 4, the second notification screen SC2 includes the first execution message 300, a second execution message 310 indicating that the purge action is being executed and that the printer 10 will be enabled for operation after completion of the purge action, and the remaining amount information 304.

In S34 of FIG. 2, the CPU 32 monitors the purge action being completed. The CPU 32 determines YES in S34 when the purge action is completed, and proceeds to S40.

In S40, the CPU 32 displays a home screen on the display unit 14. The home screen includes a message indicating that printing can be performed and a menu button. The menu button is a button for changing settings of the printer 10. When S40 ends, the CPU 32 ends the process of FIG. 2.

The CPU 32 monitors the purge action being completed in S50 concurrently with the monitoring in S30. The CPU 32 determines YES in S50 when the purge action is completed, and proceeds to S52.

In S52, the CPU 32 displays a third notification screen SC3 on the display unit 14. As illustrated in FIG. 5, the third notification screen SC3 includes a completion message 312 indicating that the purge action has been completed, the promotion message 302, the remaining amount information 304, the QR Code 306, and the OK button 308.

In S54 in FIG. 2, the CPU 32 monitors that the OK button 308 on the third notification screen SC3 being selected. The CPU 32 determines YES in S54 when the OK button 308 is selected, and proceeds to S40.

If NO is determined in S14, the CPU 32 displays a fourth notification screen SC4 on the display unit 14 in S60. As illustrated in FIG. 6, the fourth notification screen SC4 includes the first execution message 300, the promotion message 302, and the remaining amount information 304. That is, the fourth notification screen SC4 does not include the QR Code 306 (see FIG. 3). S62 is the same as S34. When the CPU 32 determines YES in S62, the CPU 32 proceeds to S40. The fourth notification screen SC4 may include a message and/or the like notifying that the printer and the server 200 need to be enabled for communication with each other in order to cause the server 200 to start the flat-rate service.

Effect of Present Embodiment

According to the above configuration, the printer 10 displays the promotion message 302 (see FIGS. 3, 5, and 6) to prompt the subscription to the flat-rate service when the purge action (S12 in FIG. 2) is executed by the print executing unit 16 (S20, S52, S60). Thus, the user can check the promotion message 302. Thus, user convenience can be improved.

In particular, in the present embodiment, the printer 10 displays the promotion message 302 to prompt the subscription to the flat-rate service (S20, S60) while the purge action (S12 in FIG. 2) is being executed by the print head 18. Thus, the user can check the promotion message 302 while the purge action is being executed. Thus, user convenience can be improved. The purge action is executed when the ink cartridge is attached to the print executing unit 16 for the first time. Since attachment of the ink cartridge to the print executing unit 16 is performed by the user, the user is likely to be near the printer 10 while the purge action is being executed. Therefore, by virtue of the promotion message 302 being displayed on the display unit 14 of the printer 10 while the purge action is being executed, the likelihood that the user checks the promotion message 302 can be increased.

As described above, communication needs to be executed between the printer 10 and the server 200 in order to cause the server 200 to start the flat-rate service after the user has started to subscribe to the flat-rate service. Specifically, the start request needs to be sent from the printer to the server 200. Therefore, when the printer 10 is not enabled for communication with the server 200, the situation in which the printer 10 cannot cause the server 200 to start the flat-rate service even when the user subscribes to the flat-rate service occurs. According to the above configuration, in the state where the printer 10 is enabled for communication with the server 200 (YES in S14), the printer 10 displays the first notification screen SC1 (see FIG. 3) including the promotion message 302 and the QR Code 306 for accessing the server 200 (S20) while the purge action is being executed by the print head 18. On the other hand, in the state where the printer 10 is not enabled for communication with the server 200 (NO in S14), the printer 10 displays the fourth notification screen SC4 (see FIG. 6) which includes the promotion message 302 but does not include the QR Code 306 (S60) while the purge action is being executed by the print head 18. This reduces the possibility of the occurrence of the situation in which the printer 10 cannot cause the server 200 to start the flat-rate service even though the user subscribes to the flat-rate service. Thus, user convenience can be improved.

When the printer 10 accepts the display termination instruction from the user after displaying the first notification screen SC1 and before the purge action is completed (YES in S30), the printer 10 terminates displaying the first notification screen SC1. If the first notification screen SC1 is still displayed even after the display termination instruction is accepted from the user, the user may be annoyed. According to the above configuration, it is possible to suppress the user from being annoyed.

When the printer 10 accepts the display termination instruction from the user after displaying the first notification screen SC1 and before the purge action is completed (YES in S30), the printer 10 terminates displaying the first notification screen SC1 and displays the second notification screen SC2 (see FIG. 4) which includes the second execution message 310 indicating that the purge action is being executed (S32). According to the above configuration, the user can know that the printer 10 is being executing the purge action. Thus, user convenience can be improved.

In addition, while the purge action is being executed by the print head 18 in the state where the printer 10 is enabled for communication with the server 200 (YES in S14), the printer 10 displays the first notification screen SC1 including the first execution message 300 indicating that the purge action is being executed, the promotion message 302, and the QR Code 306. When the purge action is completed after the printer 10 displays the first notification screen SC1 and before the printer 10 accepts the display termination instruction from the user (YES in S50), the printer 10 displays the third notification screen SC3 (see FIG. 5) including the completion message 312 indicating that the purge action has been completed, the promotion message 302, and the QR Code 306 (S52) instead of the first notification screen SC1. According to the above configuration, the user can know that the purge action has been completed. Even after the purge action has been completed, the user can access the server 200 and subscribe to the flat-rate service using the QR Code 306. Thus, user convenience can be improved.

(Corresponding Relationships)

The flat-rate service is an example of "service". The QR Code 306 on the first notification screen SC1 in FIG. 3 is an example of "access information". The first notification screen SC1 is an example of "first screen". The fourth notification screen SC4 is an example of "second screen". The second notification screen SC2 is an example of the "third screen". The third notification screen SC3 is an example of "fourth screen". The remaining amount information 304 on the first notification screen SC1 in FIG. 3 is an example of "attachment information".

The process executed in S12 in FIG. 2 is an example of "cause the print head to execute a purge action". The processes executed in S20 and S60 of FIG. 2 are examples of "display on a display unit a promotion message".

The inkjet printer 10 is an example of "printer". The purge action is an example of "print preparation action". The process executed in S12 in FIG. 2 is an example of "cause the print executing unit to execute a print preparation action".

Second Embodiment

With reference to FIG. 7, a communication system 402 of the present embodiment will be described. The same reference signs are used for configurations that are common among the embodiments, and their descriptions will be omitted.

As illustrated in FIG. 7, the communication system 402 includes a laser printer 410, the mobile terminal 100, the server 200, and the AP 6. Hereafter, the laser printer 410 may be referred to simply as "printer 410".

(Configuration of Printer 410)

The printer 410 has a device name "DV2". The printer 410 includes an operation unit 412, a display unit 414, a print executing unit 416, a communication I/F 422, and a controller 430. The operation unit 412, the display unit 414, and the communication I/F 422 includes the same functions as the operation unit 12, the display unit 14, and the communication I/F 22 of the inkjet printer 10 of the first embodiment. The print executing unit 416 includes a printing mechanism of a laser scheme. A plurality of toner cartridges each containing toner corresponding to cyan, magenta, yellow, and black is attached to the print executing unit 416. The print executing unit 416 includes photoreceptors 418A to 418D and exposure devices 420A to 420D. The photoreceptors 418A to 418D are drums that transfer the toner onto print sheet. The photoreceptors 418A to 418D correspond to cyan, magenta, yellow, and black. The exposure devices 420A to 420D are configured to emit laser light to the photoreceptors 418A to 418D.

The controller 430 includes a CPU 432 and a memory 434. The CPU 432 executes various processes according to a program 436 stored in the memory 434. The memory 434 is configured of a volatile memory, a nonvolatile memory, and the like.

(Screen Display Process: FIG. 8)

With reference to FIG. 8, a screen display process executed by the CPU 432 of the printer 410 will be described. The CPU 432 executes the process of FIG. 8 when the printer 410 is turned on. The CPU 432 may execute the process of FIG. 8 when the printer 410 is turned on for the first time, or it may execute the process of FIG. 8 each time the printer 410 is turned on.

In S112, the CPU 432 starts a correction action. In the printer 410, an image is formed by scanning the laser light emitted from the exposure devices 420A to 420D to the photoreceptors 418A to 418D in a main scanning direction and a sub scanning direction. Here, the main scanning direction is a direction in which the print sheet is carried in the printer 410, and the sub-scanning direction is a direction orthogonal to the main scanning direction. For example, the emission position of the laser light emitted from the exposure device 420A may be displaced when the inside of the exposure device 420A becomes hot. Specifically, an actual emission position of the laser light may change from a target emission position of the laser light. The displacement of the actual emission position of the laser light can cause a color misalignment, which can degrade the quality of the image formed by the printer 410. The correction action is an operation to correct the displacement of the actual emission position(s) of the laser light emitted to the photoreceptors 418A to 418D. In the present embodiment, the CPU 432 measures the actual emission positions of the laser light until the insides of the exposure devices 420A to 420D becomes hot. This enables the CPU 432 to know the direction in which the actual emission position(s) of the laser light emitted from the exposure devices 420A to 420D is (are) displaced. The CPU 432 corrects the actual emission position(s) of the laser light emitted from the exposure devices 420A to 420D so that it can suppress the influence of the displacement of the actual emission position(s) of the laser light emitted from the exposure devices 420A to 420D. For example, the CPU 432 corrects the target emission position (s) of the laser light for laser light emitted from each of the exposure devices 420A to 420D in the direction opposite to the direction in which the actual emission position(s) of the laser light is (are) displaced. This allows the influence of the displacement of the actual emission position(s) of the laser light to be suppressed. The correction action is not limited to the above method, and various known methods can be applied.

S114 is the same as S14 in FIG. 2, except that it is a process executed by the CPU 432. When the CPU 432 determines YES in S114, it proceeds to S120 while the CPU 432 proceeds to S160 when it determines NO in S114.

In S120, the CPU 432 displays a first notification screen SC11 on the display unit 414. As illustrated in FIG. 9, the first notification screen SC11 includes a third execution message 500 indicating that the correction action is being executed, the promotion message 302, the QR Code 306, and the OK button 308.

In S130 of FIG. 8, the CPU 432 monitors that the OK button 308 on the first notification screen SC11 being selected. When the OK button 308 is selected, the CPU 432 determines that a display termination instruction, which is an instruction to terminate displaying the first notification screen SC11, is accepted from the user. In this case, the CPU 432 determines YES in S130 and proceeds to S132.

In S132, the CPU 432 displays a second notification screen SC12 on the display unit 414. As illustrated in FIG. 10, the second notification screen SC12 includes a third execution message 500 and a fourth execution message 510 indicating that the correction action is being executed and that the printer 410 will be enabled for operation after completion of the correction action.

In S134 of FIG. 8, the CPU 432 monitors the correction action being completed. The CPU 432 determines YES in S134 when the correction action is completed, and proceeds to S140. S140 is the same as S40 in FIG. 2 except that it is a process executed by the CPU 432. When S140 ends, the CPU 432 ends the process of FIG. 8.

The CPU 432 monitors the correction action being completed in S150 concurrently with the monitoring of S130. The CPU 432 determines YES in S150 when the correction action is completed, and proceeds to S152.

In S152, the CPU 432 displays a third notification screen SC13 on the display unit 414. As illustrated in FIG. 11, the third notification screen SC13 includes a completion message 512 indicating that the correction action has been completed, the promotion message 302, the QR Code 306, and the OK button 308.

In S154 in FIG. 8, the CPU 432 monitors the OK button 308 on the third notification screen SC13 being selected. When the OK button 308 is selected, the CPU 432 determines YES in S154 and proceeds to S140.

When NO is determined in S114, the CPU 432 displays a fourth notification screen SC14 on the display unit 414 in S160. As illustrated in FIG. 12, the fourth notification screen SC14 includes the third execution message 500 and the promotion message 302. That is, the fourth notification screen SC14 does not include the QR Code 306 (see FIG. 9). S162 is the same as S134. The CPU 432 proceeds to S140 when it determines YES in S162.

Effect of Present Embodiment

According to the above configuration, the printer 410 displays the promotion message 302 when the correction action (S112 in FIG. 8) is executed by the print executing unit 416 (S120, S152, S160). Thus, the user can check the promotion message 302. Thus, user convenience can be improved.

The correction action is executed when an operation to turn on the printer 410 is performed. Therefore, when the correction action is executed, the user is likely to be near the printer 410. Therefore, by virtue of the promotion message 302 being displayed on the display unit 414 of the printer 410 while the correction action is executed, the likelihood that the user checks the promotion message 302 can be increased.

(Corresponding Relationships)

The laser printer 410 is an example of "printer". The operation to turn on the laser printer 410 is an example of "predetermined operation". The correction action is an example of "print preparation action". The first notification screen SC11 is an example of "first screen". The fourth notification screen SC14 is an example of "second screen". The second notification screen SC12 is an example of "third screen". The third notification screen SC13 is an example of "fourth screen".

The process executed in S112 in FIG. 8 is an example of "cause the print executing unit to execute a print preparation action". The processes executed in S120, S152, and S160 of FIG. 8 are examples of "display on a display unit a promotion message".

(First Modification)

In the first embodiment, the first notification screen SC1 to the fourth notification screen SC4 may be displayed on the display unit 114 of the mobile terminal 100 instead of the display unit 14 of the printer 10. In present modification, the printer 10 sends screen data corresponding to the notification screen to the mobile terminal 100 in S20, S32, S52, and S60 in FIG. 2. Further, in the present modification, when the OK button 308 on the first notification screen SC1 is selected, the mobile terminal 100 sends to the printer 10 a signal indicating that the OK button 308 is selected. In another modification, the first notification screen SC1 to the fourth notification screen SC4 may be displayed on both the display unit 14 of the printer 10 and the display unit 114 of the mobile terminal 100. In another modification, the printer 10 may switch the display unit on which the first notification screen SC1 to the fourth notification screen SC4 are displayed depending on whether the printer 10 is enabled for communication with the mobile terminal 100. In the second embodiment, the first notification screen SC11 to the fourth notification screen SC14 may be displayed on the display unit 114 of the mobile terminal 100 instead of the display unit 414 of the printer 410. In another modification, the first notification screen SC11 to the fourth notification screen SC14 may be displayed on both the display unit 414 of the printer 410 and the display unit 114 of the mobile terminal 100. In yet another modification, the printer 410 may switch the display unit on which the first notification screen SC11 to the fourth notification screen SC14 are displayed depending on whether the printer 410 is enabled for communication with the mobile terminal 100.

(Second Modification)

In the first embodiment, S14 in FIG. 2 may be omitted. In the present modification, the printer 10 may display a notification screen including the QR Code 306 or a notification screen not including the QR Code 306, regardless of whether the printer 10 is enabled for communication with the server 200. In the second embodiment, S114 in FIG. 8 may be omitted.

(Third Modification)

S30, S32, and S50 to S54 in FIG. 2 may be omitted. In the present modification, in the case where the purge action is completed after the first notification screen SC1 has been displayed, the CPU 32 terminates displaying the first notification screen SC1 even when the display termination instruction is not accepted from the user. In the second embodiment, S130, S132, and S150 to S154 in FIG. 8 may be omitted. In the present modification, "terminate displaying the first screen" and "terminate displaying the second screen" may be omitted.

(Fourth Modification)

In the first embodiment, S32 and S34 in FIG. 2 may be omitted. In the second embodiment, S132 and S134 in FIG. 2 may be omitted.

(Fifth Modification)

In the first embodiment, S52 and S54 in FIG. 2 may be omitted. In the second embodiment, S152 and S154 in FIG. 8 may be omitted. In the present modification, "display a fourth screen on the display unit instead of the first screen" may be omitted.

(Sixth Modification)

In the first embodiment, the first notification screen SC1 to the fourth notification screen SC4 may not include the remaining amount information 304. In the present modification, "attachment information" may be omitted.

(Seventh Modification)

In the first embodiment, the CPU 32 may display the promotion message 302 on the display unit 14 only after the purge action is completed. In the present modification, the promotion message 302 is not displayed on the display unit 14 while the purge action is being executed. In the second embodiment, the CPU 432 may display the promotion message 302 on the display unit 414 only after the correction action is completed.

(Eighth Modification)

In the first embodiment, S30 to S34 and S50 to S54 in FIG. 2 may be omitted. In the present modification, the CPU 32 monitors the purge action being completed and the OK button 308 on the first notification screen SC1 being selected after the CPU 32 displays the first notification screen SC1 (see FIG. 3) on the display unit 14. When the OK button 308 is selected, the CPU 32 determines that the display termination instruction has been received from the user. That is, when the purge action is completed and the display termination instruction is received from the user, the CPU 32 terminates displaying the first notification screen SC1 and displays the home screen on the display unit 14 in S40. On the other hand, the CPU 32 terminates displaying the fourth notification screen SC4 even if no instruction is received from the user when the purge action is completed after the fourth notification screen SC4 is displayed (YES in S62). When the first notification screen SC1 is displayed, there is a possibility that the user is capturing the QR Code 306 on the first notification screen SC1 using the camera 116 of the mobile terminal 100. In such a situation, if the display of the first notification screen SC1 is terminated even when the display termination instruction is not accepted from the user, the capturing of the QR Code 306 may fail. According to the above configuration, the possibility of failure in capturing the QR Code 306 can be reduced and user convenience can be improved. In the second embodiment, S130 to S134 and S150 to S154 in FIG. 8 may be omitted. In the present modification, the CPU 432 monitors the correction action being completed and the OK button 308 on the first notification screen SC11 being selected after the first notification screen SC11 (see FIG. 9) is displayed on the display unit 414. When the OK button 308 is selected, the CPU 432 determines that the display termination instruction has been accepted from the user. That is, the CPU 432 terminates displaying the first notification screen SC11 when the correction action is completed and the display termination instruction is accepted from the user, and the CPU 432 displays the home screen on the display unit 414 in S140.

(Ninth Modification)

In the above embodiments, the processes of FIGS. 2 and 8 are implemented by the CPUs 32, 432 executing the programs 36, 436. Instead of this, at least one of the processes of FIGS. 2 and 8 may be implemented by hardware such as a logic circuit.

What is claimed is:

1. An inkjet printer comprising:
a print executing unit comprising a print head configured to eject ink, wherein before an ink cartridge is attached to the print executing unit for a first time, moisturizing liquid is filled within the print head; and
a controller configured to:
in a case where the ink cartridge is attached to the print executing unit for a first time, cause the print head to execute a purge action for discharging the moisturizing liquid; and
while the purge action is being executed by the print head, display on a display unit a promotion message for prompting subscription to a service related to the inkjet printer.

2. The inkjet printer according to claim 1, wherein
the service is provided by a server,
wherein the controller is configured to:
while the purge action is being executed by the print head under a state where the inkjet printer is enabled for communication with the server, display on the display unit a first screen including the promotion message and access information to access the server; and
while the purge action is being executed by the print head under a state where the inkjet printer is not enabled for communication with the server, display on the display unit a second screen including the promotion message and not including the access information.

3. The inkjet printer according to claim 2, wherein
the controller is further configured to:
in a case where the purge action is completed after the first screen has been displayed and a display termination instruction is accepted from a user, terminate displaying the first screen; and
in a case where the purge action is completed after the second screen has been displayed, terminate displaying the second screen even when an instruction is not accepted from the user.

4. The inkjet printer according to claim 3, wherein
the controller is configured to, in a case where the display termination instruction is accepted from the user after the first screen has been displayed and before the purge action is completed, terminate displaying the first screen.

5. The inkjet printer according to claim 4, wherein
the controller is configured to, in the case where the display termination instruction is accepted from the user after the first screen has been displayed and before the purge action is completed, terminate displaying the first screen and display on the display unit a third screen including a message indicating that the purge action is being executed.

6. The inkjet printer according to claim 3, wherein
the controller is configured to, while the purge action is being executed by the print head under the state where the inkjet printer is enabled for communication with the server, display the first screen including the promotion message, the access information and an execution message indicating the purge action is being executed,
wherein the controller is further configured to:
in a case where the purge action is completed after the first screen has been displayed and before the display termination instruction is accepted from the user, display a fourth screen on the display unit instead of the first screen, wherein the fourth screen includes the promotion message, the access information and a completion message indicating the purge action is completed.

7. The inkjet printer according to claim 1, wherein
the controller is configured to, while the purge action is being executed, display on the display unit the promotion message and attachment information indicating the ink cartridge is attached to the print executing unit.

8. A non-transitory computer-readable recording medium storing computer-readable instructions for an inkjet printer:

wherein the computer-readable instructions, when executed by the inkjet printer, cause the inkjet printer to:
- in a case where an ink cartridge is attached to the print executing unit for a first time, cause the print head to execute a purge action for discharging moisturizing liquid; and
- while the purge action is being executed by the print head, display on a display unit a promotion message for prompting subscription to a service related to the inkjet printer.

9. A printer comprising:
a print executing unit; and
a controller configured to:
- in a case where a predetermined operation is accepted from a user of the printer, cause the print executing unit to execute a print preparation action;
- in a case where the print preparation action is executed by the print executing unit, display on a display unit a promotion message for prompting subscription to a service related to the printer, the service being provided by a server;
- while the print preparation action is being executed, display the promotion message on the display unit;
- while the print preparation action is being executed by the print executing unit under a state where the printer is enabled for communication with the server, display on the display unit a first screen including the promotion message and access information to access the server; and
- while the print preparation action is being executed by the print executing unit under a state where the printer is not enabled for communication with the server, display on the display unit a second screen including the promotion message and not including the access information.

10. The printer according to claim 9, wherein the controller is further configured to:
- in a case where the print preparation action is completed after the first screen has been displayed and a display termination instruction is accepted from a user, terminate displaying the first screen; and
- in a case where the print preparation action is completed after the second screen has been displayed, terminate displaying the second screen even when an instruction is not accepted from the user.

11. The printer according to claim 10, wherein the controller is configured to, in a case where the display termination instruction is accepted from the user after the first screen has been displayed and before the print preparation action is completed, terminate displaying the first screen.

12. The printer according to claim 11, wherein the controller is configured to, in the case where the display termination instruction is accepted from the user after the first screen has been displayed and before the print preparation action is completed, terminate displaying the first screen and display on the display unit a third screen including a message indicating that the print preparation action is being executed.

13. The printer according to claim 10, wherein
the controller is configured to, while the print preparation action is being executed by the print executing unit under the state where the printer is enabled for communication with the server, display the first screen including the promotion message, the access information and an execution message indicating the print preparation action is being executed,
the controller is further configured to:
- in a case where the print preparation action is completed after the first screen has been displayed and before the display termination instruction is accepted from the user, display a fourth screen on the display unit instead of the first screen, wherein the fourth screen includes the promotion message, the access information and a completion message indicating the print preparation action is completed.

14. The printer according to claim 9, wherein
the printer is a laser printer,
the print executing unit includes a photoreceptor and an exposure device configured to emit laser light to the photoreceptor,
the print preparation action is an action for correcting displacement of an emission position of the laser light emitted from the exposure device to the photoreceptor, and
the predetermined operation is for turning on the laser printer.

15. A non-transitory computer-readable recording medium storing computer-readable instructions for a printer:
wherein the computer-readable instructions, when executed by the printer, cause the printer to:
- in a case where a predetermined operation is accepted from a user of the printer, cause the print executing unit to execute a print preparation action;
- in a case where the print preparation action is executed by the print executing unit, display on a display unit a promotion message for prompting subscription to a service related to the printer, the service being provided by a server;
- while the print preparation action is being executed, display the promotion message on the display unit;
- while the print preparation action is being executed by the print executing unit under a state where the printer is enabled for communication with the server, display on the display unit a first screen including the promotion message and access information to access the server; and
- while the print preparation action is being executed by the print executing unit under a state where the printer is not enabled for communication with the server, display on the display unit a second screen including the promotion message and not including the access information.

* * * * *